United States Patent
Li et al.

(10) Patent No.: US 12,450,718 B1
(45) Date of Patent: Oct. 21, 2025

(54) QUANTIFICATION METHOD FOR MICROSCOPIC CRACKS INSIDE 3D PRINTED CONCRETE AND SYSTEM THEREOF

(71) Applicants: Jiangxi Transportation Investment Group Co., Ltd., Nanchang (CN); East China Jiaotong University, Nanchang (CN); Liyang Institute of Smart City, Chongqing University, Changzhou (CN)

(72) Inventors: Baidian Li, Nanchang (CN); Xiangyu Wang, Nanchang (CN); Junbo Sun, Changzhou (CN); Fei Wu, Nanchang (CN); Jianqun Wang, Xiangtan (CN); Yangqing Liu, Nanchang (CN); Bo Huang, Xiangtan (CN); Weixiang Shi, Nanchang (CN); Qiaoming Guo, Nanchang (CN); Yufei Wang, Nanchang (CN)

(73) Assignees: Jiangxi Transportation Investment Group Co., Ltd., Nanchang (CN); East China Jiaotong University, Nanchang (CN); Liyang Institute of Smart City, Chongqing University, Changzhou (CN)

( * ) Notice: Subject to any disclaimer, the term of this patent is extended or adjusted under 35 U.S.C. 154(b) by 0 days.

(21) Appl. No.: 19/203,267

(22) Filed: May 9, 2025

(30) Foreign Application Priority Data

Jul. 8, 2024 (CN) .......................... 202410906818.3

(51) Int. Cl.
*G06T 7/00* (2017.01)
*G06T 5/70* (2024.01)
(Continued)

(52) U.S. Cl.
CPC .............. *G06T 7/0004* (2013.01); *G06T 5/70* (2024.01); *G06T 7/13* (2017.01); *G06V 10/26* (2022.01);
(Continued)

(58) Field of Classification Search
CPC .......... G06T 7/0004; G06T 5/70; G06T 7/13; G06T 2207/20028; G06T 2207/20081;
(Continued)

(56) References Cited

U.S. PATENT DOCUMENTS

2024/0221357 A1    7/2024   Cao

FOREIGN PATENT DOCUMENTS

| CN | 115272826 A | 11/2022 |
|---|---|---|
| CN | 116777898 B | 9/2023 |

(Continued)

*Primary Examiner* — Samir A Ahmed
(74) *Attorney, Agent, or Firm* — JEEN IP LAW, LLC

(57) ABSTRACT

Provided are a quantification method for microscopic cracks inside 3D printed concrete and a system thereof. Before measuring the microscopic crack images according to relevant standards, firstly, a denoising network, improved attention-guided denoising neural network (IADNet) is adopted. IADNet can extract features from microscopic crack images from different perspectives, perceive noise from multiple levels, and perform denoising processing, greatly improving image quality and enhancing texture details, which is beneficial for training segmentation networks. The combination of IADNet and semantic segmentation algorithm has the ability to finely recognize image information, quantify microscopic crack recognition, overcome the shortcomings of measurement and analysis of microscopic cracks inside 3D printed concrete, and improve construction efficiency and quality.

9 Claims, 4 Drawing Sheets

(51) Int. Cl.
  *G06T 7/13* (2017.01)
  *G06V 10/26* (2022.01)
  *G06V 10/30* (2022.01)
  *G06V 10/762* (2022.01)
  *G06V 10/82* (2022.01)

(52) U.S. Cl.
  CPC ............ *G06V 10/30* (2022.01); *G06V 10/763* (2022.01); *G06V 10/82* (2022.01); *G06T 2207/20028* (2013.01); *G06T 2207/20081* (2013.01); *G06T 2207/20084* (2013.01); *G06T 2207/30132* (2013.01)

(58) Field of Classification Search
  CPC .......... G06T 2207/20084; G06V 10/26; G06V 10/30; G06V 10/763; G06V 10/82
  See application file for complete search history.

(56) References Cited

FOREIGN PATENT DOCUMENTS

| | | | | |
|---|---|---|---|---|
| CN | 117011280 A | * | 11/2023 | ........... G06T 7/0002 |
| CN | 117115140 A | * | 11/2023 | ........... G06T 7/0002 |
| CN | 117830137 A | | 4/2024 | |
| CN | 117976101 A | * | 5/2024 | ............. G16C 20/20 |
| CN | 118038100 A | | 5/2024 | |

* cited by examiner

QUANTIFICATION METHOD FOR MICROSCOPIC CRACKS INSIDE 3D PRINTED CONCRETE AND SYSTEM THEREOF

CROSS-REFERENCE TO RELATED APPLICATIONS

This application claims to the benefit of priority from Chinese Application No. 202410906818.3 with a filing date of Jul. 8, 2024, the content of the aforementioned applications, including any intervening amendments thereto, are incorporated herein by reference.

TECHNICAL FIELD

The present disclosure relates to the technical field of image semantic segmentation and intelligent building, in particular to a quantification method for microscopic cracks inside 3D printed concrete and a system thereof.

BACKGROUND

Microscopic cracks are a common structural damage that poses a threat to the health of concrete building structures. Concrete structures are prone to microscopic cracks due to factors such as load and environment. The microscopic crack will allow into media such as air to permeate the interior of concrete structures, leading to a decrease in key parameters such as structural stiffness. When the width of microscopic crack is too large, it will accelerate the water seepage and corrosion of the structure, thereby weakening the stability of the structure, ultimately leading to damage, and even causing natural disasters such as landslides, bringing significant safety risks and economic losses. Therefore, the detection and measurement of microscopic cracks are crucial in ensuring the safety and quality of concrete structures.

The use of 3D printing technology accelerates the manufacturing process, eliminates the need for formworks, reduces the use of materials, increases the design flexibility, and shows the rapid growth potential of this technology in the construction industry. However, compared to traditional concrete construction, the formwork-free and extruded filament processes of 3D printing constitute great challenges. During the manufacturing process of pouring concrete, the bleeding accumulated in the surface restricts the evaporation of water in the pores, effectively reducing shrinkage caused by formwork. On the contrary, due to the unique production process, the materials used in 3D printing technology require more fine particles and lower water-cement ratio, resulting in reduced bleeding compared to traditional concrete. The pore water in printed concrete is exposed to evaporation conditions for a long time, which increases the loss of pore water and overall shrinkage. Therefore, 3D printed concrete is more susceptible to the influence of microscopic cracks. The traditional analysis method for microscopic cracks mainly relies on visual inspection of SEM images, heavily relies on physical labor, and heavily relies on the observer's experience. The more advanced analytical methods is semi-automatic method, which involves equipment assistance, however, there are still shortcomings in providing automatic detection and quantification capabilities.

Image segmentation technology has wide applications in fields such as computer vision and natural language processing. Applying this technology to the detection of microscopic cracks inside 3D printed concrete is an ideal intelligent detection method that can achieve real-time quality monitoring and quantitative analysis of microscopic cracks. However, although traditional microscopic crack recognition network can accurately locate microscopic crack images, the accuracy in detecting microscopic cracks, especially when the microscopic cracks present irregular shapes, is low. Therefore, the guiding role of traditional microscopic crack recognition network in practical engineering is limited. It is urgent to use stable, real-time, and high-precision semantic segmentation algorithms for monitoring and measuring microscopic cracks inside 3D printed concrete. In recent years, the development of image analysis method based on multiple deep learning has provided a new approach to solve this problem, and the present disclosure proposes a novel quantification method for detecting microscopic cracks inside 3D printed concrete based on multiple deep learning and machine learning improvements.

SUMMARY

The objective of the present disclosure is to overcome the drawbacks of the above technologies and provide a quantification method and system for microscopic cracks inside 3D printed concrete. This method has high stability, good real-time performance, and can achieve high-precision quantitative measurement of microscopic cracks inside 3D printed concrete.

In order to solve the above technical problems, the technical solution of the present disclosure is:

In the first aspect, the present disclosure provides a quantification method for microscopic cracks inside 3D printed concrete, which includes the following steps:

1. Preparing a Microscopic Crack Image Dataset

Using backscattered electron (BSE) to obtain defect image data of printing areas of 3D printed concrete, forming the microscopic crack image dataset, wherein the microscopic crack image dataset includes 3D printed concrete microscopic crack images, non 3D printed concrete microscopic crack images, and concrete images without microscopic cracks;

2. Treating of Improved Attention-Guided Denoising Neural Network (IADNet)

Constructing an improved attention-guided denoising neural network (IADNet), wherein the improved attention-guided denoising neural network (IADNet) includes a sparse block (SB), a feature enhancement block (FEB), an attention block (AB), and a reconstruction block (RB);

The sparse block (SB) includes five convolutional layers and four dilated convolutional layers, each layer including a Leaky ReLU function stacked with convolution or dilated convolution, connected in a order of one convolutional layer, one dilated convolutional layer, two convolutional layers, two dilated convolutional layers, two convolutional layers, and one dilated convolutional layer;

The feature enhancement block (FEB) includes a convolutional layer, a convolution operation, a compression concatenation operation, a convolution operation, and a hyperbolic tangent activation function connected in sequence; an output result of the sparse block (SB) is used as an input of the feature enhancement block (FEB);

The attention block (AB) includes 1×1 convolution operation and vector dot product operation; an input of the 1×1 convolution operation is connected to an output processed by the hyperbolic tangent activation function of the feature enhancement block (FEB), and features obtained by the 1×1 convolution operation are used as weight vectors to perform vector dot product operation with an output of a first convolution operation in the feature enhancement block (FEB); an output of the vector dot product operation is connected to the reconstruction block (RB) to obtain an output denoised image;

Training the improved attention-guided denoising neural network (IADNet) using the microscopic crack image dataset to obtain a trained improved attention-guided denoising neural network (IADNet), then applying the trained improved attention-guided denoising neural network (IADNet) to denoise the images to construct a crack segmentation dataset;

3. Constructing MCR-Former Network for Quantitative Measurement of Microscopic Crack Images The MCR-Former network includes a path block, processing an input image through the path block to extract a feature F and complete path embedding, then clustering the feature F using a clustering block to obtain a prototype feature G to construct a parallel structure including two heterogeneous operators of prototype-based high-frequency extractor (PH) and pixel enhancer module (PM); the prototype-based high-frequency extractor (PH) captures advantageous frequency components of the prototype feature G to obtain an initial representation G'; the pixel enhancer module (PM) is a CNN based pixel enhancer that restores the prototype representation G to obtains a feature F' of a next stage; and the clustering block and the parallel structure are repeated in four groups and connected in sequence; afterwards, using a convolutional layer to further filtering to make the features recognized by the network more prominent, then performing simplification through group normalization, followed by ReLU activation function processing; finally, using one convolutional layer as a classification layer (CLS) of single-scale feature to output the segmented image;

Training the MCR-Former network using the crack segmentation dataset to obtain a trained MCR-Former neural network;

Performing denoising treatment using the trained improved attention-guided denoising neural network (IADNet), then inputting vector data into the trained MCR-Former neural network to obtain a microscopic crack segmentation result, and then further calculating a microscopic crack width based on the microscopic crack segmentation result.

The process of constructing the crack segmentation dataset is as follows: after denoising by the improved attention-guided denoising neural network (IADNet), performing data enhancement on all microscopic crack image datasets using the MSR algorithm:

① Performing log transformation on an original image to obtain a log image; ② Performing Gaussian blur on the log image to obtain an blurred log image, i.e., a low-frequency information part; ③ Performing difference between the original image and the blurred log image to obtain an image Q;

Performing ① ② ③ operations on R, G, and B three dimensions of the original image, respectively, and the difference is that the Gaussian blur in ② respectively sets sigmoid parameters to 15, 80, and 200; finally, computing a weighted average of results of the ① ② ③ operations on the three dimensions, then merging the three dimensions, and scaling the data to 0-255 to obtain the crack segmentation dataset R*;

Allocating the crack segmentation dataset R* in a 9:1 ratio to a training and validation dataset and a testing dataset for training the MCR-Former network.

The MCR-Former outputs the category to which each pixel of the input image belongs, achieving semantic segmentation;

Based on the microscopic crack segmentation result of the MCR-Former, combined with bilateral filtering, morphological processing, Canny edge detection, k+1-means clustering and eight-direction search method are used to achieve high-precision measurement of the microscopic crack width, and the overall steps are as follows:

1) Using bilateral filtering method, firstly Gaussian blur is applied to remove interfering pixels and preserve a true microscopic crack information;

2) Then, the microscopic cracks are refined through morphological processing to obtain a microscopic crack skeleton of single pixel; at this point, all pixel values in the microscopic crack skeletons are 0 or 1 to form a binary microscopic crack skeleton, called a single pixel microscopic crack skeleton; using the Canny edge detection algorithm, the grayscale gradient of the single pixel microscopic crack skeleton is calculated to find image edges and obtain microscopic crack edge maps; the microscopic crack edge maps obtained by the Canny edge detection are logically processed pixel by pixel with the single pixel microscopic crack skeleton;

3) k+1-means clustering:

Selecting k+1 cluster center points for the results of logic and operations, using k+1 as comparison parameters, calculating the variance with the results of the previous k cluster center points, further enhancing the data representation for optimization calculation to obtain the optimal result, and the specific steps are:

Step 3-1: randomly initializing k+1 points in an input image set, and selecting k points from the k+1 points as initial target center points for the k+1-means algorithm;

Step 3-2: using the Euclidean distance calculation formula to calculate the geometric distances between the input image set and the initialization target center point;

Step 3-3: allocating each point of data to the nearest cluster according to the principle of shortest distance;

Step 3-4: calculating the geometric center of each cluster for the new round using the following formula, $$P_y = \frac{\sum_{i=1}^{p} P_{iy}}{p}$$

$$P_x = \frac{\sum_{i=1}^{p} P_{ix}}{p}$$

Wherein $P_x$ and $P_y$ represent the horizontal coordinate and the vertical coordinate of the geometric center point to be calculated for the current cluster respectively; $P_{ix}$ and $P_{iy}$ represent the horizontal coordinate and the vertical coordinate of the i th point in the current cluster respectively; p represent the number of points in the current cluster;

Using the geometric centers of the sample data in each cluster as the clustering centers for the new classification;

Step 3-5: performing iterative repetitions of step 3-2, step 3-3, and step 3-4 until the algorithm converges, the center point no longer changes, and output clustering results;

Step 3-6: optimizing the clustering results obtained by taking the variance between the obtained K center points and the k+1 th center point, using the following formula:

$$S^2 = \frac{\sum_{j=1}^{k}(x_{k+1} - x_j)^2}{k+1}$$

Wherein $x_{k+1}$ represents the coordinates of the k+1 th center point, $x_j$(j=1, 2, ... k) represents the coordinates of the k th cluster center point; selecting the cluster center point with the smallest variance to determine the optimal cluster center point;
Determining the optimal clustering result;
4) Skeleton extraction: extracting the skeleton from the results of k+1-means clustering, and the specific skeleton extraction process is as follows:
Iterating through all foreground pixels and mark pixels that meet any of the following conditions as deletion:

$2 \leq N(F_1) \leq 6$ $S(F_1) = 1$ $F_2 F_4 F_6 = 0$ $F_4 F_6 F_8 = 0$ $F_2 F_4 F_8 = 0$ $F_2 F_6 F_8 = 0$ Wherein, $N(F_1)$ represents the number of foreground pixels among the 8 pixels adjacent to $F_1$, $S(F_1)$ represents the cumulative number of occurrences from 0-1 from the pixels $F_2$-$F_9$-$F_2$, where 0 represents the background, 1 represents the foreground, and F represents a pixel point; and the complete pixel position distribution of $F_1$-$F_9$ is:

| $F_9$ | $F_2$ | $F_3$ |
| --- | --- | --- |
| $F_8$ | $F_1$ | $F_4$ |
| $F_7$ | $F_6$ | $F_5$ |

Until no pixels are marked as deletion, the output result is the refined skeleton of the binary image;
5) Using the eight-direction search method to calculate the microscopic crack width:
For the refined skeleton of the binary image, each microscopic crack point is used as the initial target center point for width measurement, performing the eight-direction search started from the initial target center point in the extracted refined skeleton of the binary image; if it is a microscopic crack point, the number of pixels in that direction is increased by 1 until the microscopic crack boundary is reached, counting the number of microscopic crack pixels in the eight directions of 0°, 45°, 90°, 135°, 180°, 225°, 270°, 315° where one center point is located as n1, n2, n3, n4, n5, n6, n7, and n8; merging the number of microscopic crack points in four directions: 0° and 180°, 45° and 225°, 90° and 270°, 135° and 315°, and the merging method is: $d_1 = n_1 + n_5$, $d_2 = 2^{1/2}(n_2 + n_6)$, $d_3 = n_3 + n_7$, $d_4 = 2^{1/2}(n_4 + n_8)$, taking $D = \min\{d_1, d_2, d_3, d_4\}$, and recording the direction of D obtained, wherein $d_1$, $d_2$, $d_3$, $d_4$ are the number of pixels in the merged four straight line directions; calculating $W = w_0 \times D$, wherein $w_0$ is the actual physical size represented by each pixel, and W is the actual width of the microscopic crack at the target center point; updating to the next center point until the width at all center points is measured.

Further, a measurement parameter threshold is set, and if the MCR-Former network recognizes a microscopic crack defect image and the microscopic crack width is greater than the measurement parameter threshold, then stop the printing and check the material status; if the microscopic crack width is not exceed the measurement parameter threshold, then the printed material is qualified.

Further, when the training of the improved attention-guided denoising neural network (IADNet) is completed, a peak signal-to-noise ratio (PSNR) of denoising evaluation effect is not less than 32.169 db, and a structural similarity value (SSIM) is not less than 0.89.

Further, a pointwise convolutional-feedforward neural network (PT-FFN) is introduced into the parallel structure of the MCR-Former network, including sequentially connected an input layer, a depthwise convolutional layer, a ReLU activation function, a first group normalization layer, a pointwise convolutional layer, a ReLU activation function, a second group normalization layer, an pooling layer, a fully connected layer, and an output layer; and a sum of the normalization layers of the first group normalization layer and the second group normalization layer is used as an input of the average pooling layer;
The size of the convolution kernel of the Pointwise convolutional layer is 1×1.

Further, the sparse block (SB) in the improved attention-guided denoising neural network (IADNet) has nine layers, and a first layer, a third layer, a fourth layer, a seventh layer, and an eighth layer are considered as low-energy points and set with convolutional layers (Conv+Leaky ReLU); a second layer, a fifth layer, a sixth layer, and a ninth layer are considered high-energy points and are set as dilated convolutional layers (dilated Conv+Leaky ReLU); the size of the convolutional filter for the first layer to the ninth layer is 3×3, an input for the first layer is the number of channels C in an input noise image, and if the input noise image is in color, C is 3, otherwise, C is 1;
The feature enhancement block (FEB) has five levels, including three types: Conv+Leaky ReLU, Conv, and hyperbolic tangent activation function Tanh; the convolutional layer of Conv+Leaky ReLU applied in a tenth layer of the improved attention-guided denoising neural network (IADNet) has an output size of 64×3×3×64; an eleventh layer of the improved attention-guided denoising neural network (IADNet) through adjustment of Conv convolution has an output size 64×3×3×c; finally, an initial input of network and the output of the eleventh layer are concatenated through Concat compression concatenation operation, then processed through Conv convolution operation, and a final output size is 64×3×3×2c; the obtained features are converted into nonlinear features using the hyperbolic tangent activation function Tanh;
The input size for the 1×1 convolution operation of the attention block (AB) is 2c×1×1×c.

In the second aspect, the present disclosure provides a quantification system for microscopic cracks inside 3D printed concrete, which includes:
An image acquisition module, configured to obtain the microscopic crack images of the 3D printed concrete in the printing areas;
An image processing module, configured to segment and label the microscopic crack images of the image acquisition module at a pixel level, add IADNet to preprocess the microscopic crack images for denoising, and then perform data augmentation representation to obtain the crack segmentation dataset;

A 3D printed concrete microscopic crack segmentation model, using MCR-Former neural network for microscopic crack image segmentation;

A width processing and calculation module, utilizing bilateral filtering, morphological processing, Canny edge detection, k+1-means clustering and eight-direction search method to achieve high-precision measurement of the microscopic crack width and obtain an actual width of microscopic cracks;

A microscopic crack threshold feedback processing module, configured to compare the actual width of microscopic cracks obtained by the width processing and calculation module with the measurement parameter threshold; if the actual width of microscopic cracks exceeds the measurement parameter threshold, it is considered that the quality of the 3D printed product is unqualified, and feedback is given to stop printing and check the material status; if the actual width of microscopic cracks does not exceed the measurement parameter threshold, the 3D printed product is considered qualified.

In the third aspect, the present disclosure provides a computer-readable storage medium, on which a computer program is stored, and the steps of the method can be implemented when the computer program is executed by a processor.

Compared with the existing technology, the advantageous effects of the present disclosure are:

Before conducting relevant standard measurements on microscopic crack images, the present disclosure first adopts a denoising network, improved attention-guided denoising neural network (IADNet). IADNet can extract features from microscopic crack images from different perspectives, perceive noise from multiple levels, and perform denoising processing, greatly improving image quality and enhancing texture details, including the problem of difficult to discover hidden features due to complex image backgrounds. The microscopic crack images preprocessed by the method mentioned can provide more feature information, ensure the quality of key parameters, and facilitate the training of segmentation networks. The present disclosure can further avoid image distortion to improve the accuracy of collecting image data, wherein the image distortion refers to the loss of texture details and visual perception caused by the loss or error of certain pixel information. By combining IADNet with semantic segmentation algorithms, it has the ability to finely recognize image information, quantify microscopic crack recognition, overcome the shortcomings of measuring and analyzing microscopic cracks in 3D printed concrete, improve construction efficiency and quality, reduce reliance on manual monitoring, and provide a more reliable and safe solution for 3D printed concrete construction.

The use of microscopic cracks recognition-former (MCR-Former) network in the present disclosure greatly improves the accuracy of segmentation and prediction, enabling the system to achieve real-time high-precision measurement. Compared to traditional AFFormers, which add convolutional layers, GN layers, and non-linear activation function ReLU for multi-layer convolution, feature extraction is carried out from both shallow and deep features, ensuring the quality of feature information while also solving the problem of shallow features affecting deep features caused by too deep network layers, making the model more stable and reliable. And through the stacking and repeated use of PT-FFN modules, MCR-Former can effectively learn the spatial relationships and semantic information between features, improving the accuracy of semantic segmentation. Compared with traditional DC-FFN modules, PT-FNN module has a lightweight structure that can reduce the computational complexity of the model, which is suitable for real-time semantic segmentation tasks in resource limited environments, effectively adjusting the number of channels in the image to achieve different dimensional operations. At the same time, it processes the image feature information into low-frequency and high-frequency information, thereby greatly ensuring the quality of high-frequency information, improving the overall details of the image, ensuring the maximum detail texture quality of the image, and enhancing the performance of feature information in the image.

The present disclosure first applies segmentation algorithms to separate microscopic cracks from the background, and then applies edge detection algorithms to extract edge information of microscopic cracks based on the segmentation results. By fully utilizing the accuracy of segmentation algorithms and the edge refinement capabilities of edge detection algorithms, more accurate and complete microscopic crack edges are obtained.

The introduction of automation and intelligence technology in the system of the present disclosure can improve the accuracy of microscopic crack measurement in 3D printed concrete. It can be flexibly adjusted according to different printing materials and defect types, including parameters such as the movement speed of the printer nozzle, the extrusion rate, and the material's dry/wet state. By implementing feedback mechanism and guiding staff adjustment, the system can adapt to various needs and application scenarios. This high degree of customizability gives the system with a wide range of applicability and practicality. Not only can it be applied to quality monitoring of 3D printed concrete, but it can also be extended to other fields such as surface defect detection in metal 3D printing, medical 3D printing, aviation 3D printing, and so on.

The system of the present disclosure provides the possibility of achieving larger scale building level 3D printing, further promoting the development of this field, and has significant significance and broad application prospects. At the same time, it also provides strong support and guarantee for the development of concrete 3D printing technology.

Compared with existing technologies, the system of the present disclosure adopts image denoising processing technology and improved image segmentation technology to achieve quantitative measurement and analysis of microscopic cracks inside 3D printed concrete. It can accurately and efficiently detect microscopic crack defects and quantify them, providing an effective means for ensuring printing quality.

DETAILED DESCRIPTION OF THE EMBODIMENTS

In the description of this specification, the reference terms such as "one embodiment", "some embodiments", "examples", "specific examples", or "some examples" mean that the specific features, structures, materials, or characteristics described in conjunction with the embodiment or example are included in at least one embodiment or example of the present disclosure. In this specification, the illustrative expressions of the above terms may not necessarily refer to the same embodiments or examples. Moreover, the specific features, structures, materials, or characteristics described can be combined in any one or more embodiments or examples in an appropriate manner.

The present disclosure provides a quantification method for microscopic cracks inside 3D printed concrete. The overall method includes: preparing a dataset of microscopic crack images, using the improved attention-guided denoising neural network (IADNet) to denoise the microscopic crack images, and training the de-noised high-quality microscopic crack images in the microscopic cracks recognition-former (MCR-Former) network to achieve quantitative measurement of microscopic crack images.

The specific steps of the quantification method are:

1. Preparing a Dataset of Microscopic Crack Images

The defect image data of the 3D printed concrete in printing areas are obtained by using backscattered electron (BSE) to form a dataset of microscopic crack images. The dataset of microscopic crack images in this experiment consists of 3000 3D printed concrete microscopic crack images, 2000 non 3D printed concrete microscopic crack images, and 1500 concrete images without microscopic cracks. Each image in the dataset of microscopic crack images is a 512×512 pixel RGB image. The addition of non 3D printed conventional concrete images is to improve training accuracy and robustness, enabling more accurate recognition of the 3D printed concrete microscopic crack images.

2. Treating of Improved Attention-Guided Denoising Neural Network (IADNet)

Figure 3:
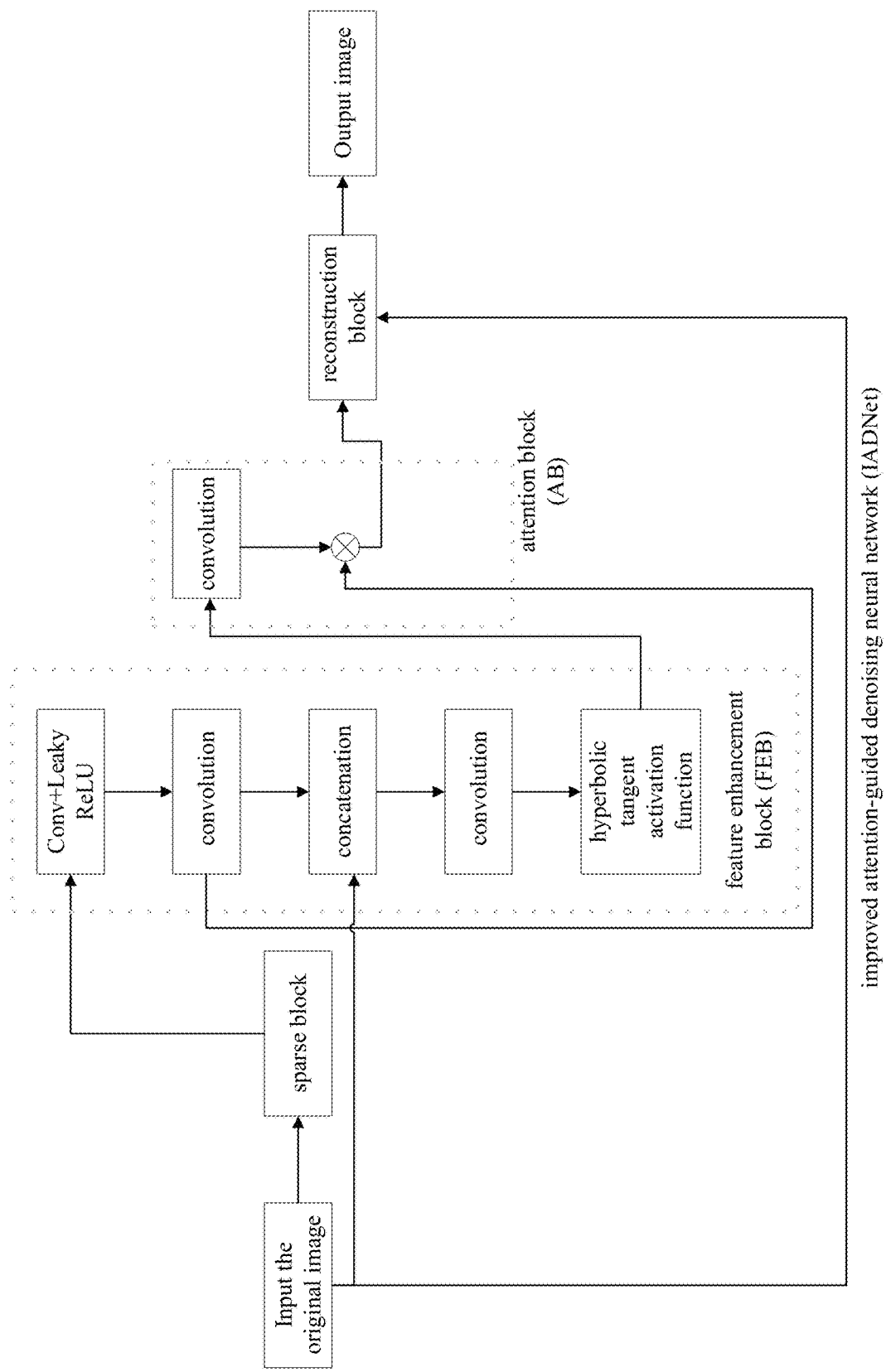
FIG. 3 is a structural schematic diagram of the improved attention-guided denoising neural network (IADNet) in the present disclosure.

The improved attention-guided denoising neural network (IADNet), as shown in FIG. 3, includes a sparse block (SB), a feature enhancement block (FEB), an attention block (AB), and a reconstruction block (RB). The present disclosure uses the improved attention-guided denoising neural network (IADNet) to preprocess microscopic crack images, which can effectively solve the difficulties in traditional network models during processing of microscopic crack image samples when outputting microscopic crack area and measuring microscopic crack width, such as low image quality, blurry available feature information, and image noise interfering with network training. And it can avoid the loss of high-frequency detail information of the microscopic crack image and smoothness reduction, enhance the effect of the microscopic crack image while retaining the intuitive perception of human eyes, so that when the microscopic crack image is converted from a color image to a gray image, more available pixel information is retained, and the loss of image texture details is avoided, which is beneficial to further processing of the microscopic crack image.

Denoting the input image as $I^{(i)} \in R^{h \times w \times c}$ (h, w, c represent the height, width, and channel number of the image respectively) and passing through the sparse block (SB), the sparse block (SB) combines dilated convolution and convolution to extract multi-scale features from microscopic crack images, increasing the perceptual field of view, ensuring the underlying information of features, obtaining as much usable information as possible, while reducing computational complexity and memory consumption. Then passing through the feature enhancement block (FEB), the feature enhancement block (FEB) fully utilizes global and local features through a long path to mine more robust features, which is complementary to the sparse block (SB) in processing given noise images, solving the weakening effect of shallow features on deep features as depth increases in deep networks, and achieving further enhancement processing of extracted features. Then entering the attention block (AB), the attention block (AB) uses the current stage to guide previous stages in learning noise information, in order to capture key noise features hidden in the complex background of microscopic crack images, making microscopic crack feature extraction more accurate. Finally, the reconstruction block (RB) uses reinforcement learning techniques on residual images to restore clearer images, and then outputs high-quality, high texture detail microscopic crack images after denoising processing.

The use of the sparse block (SB) is helpful for IADNet to obtain shallow network architecture, and the feature enhancement block (FEB) compresses the number of output channel in the eleventh layer to C. The attention block (AB) uses a 1×1 convolutional filter to reduce the number of parameters until the peak signal-to-noise ratio (PSNR) reaches 32.169 db and the structural similarity value (SSIM) reaches 0.89, then stops training. The IADNet ensures the continuity of image feature information between shallow layer and deep layer in the network while reducing network parameters to accelerate convergence.

Figure 4:
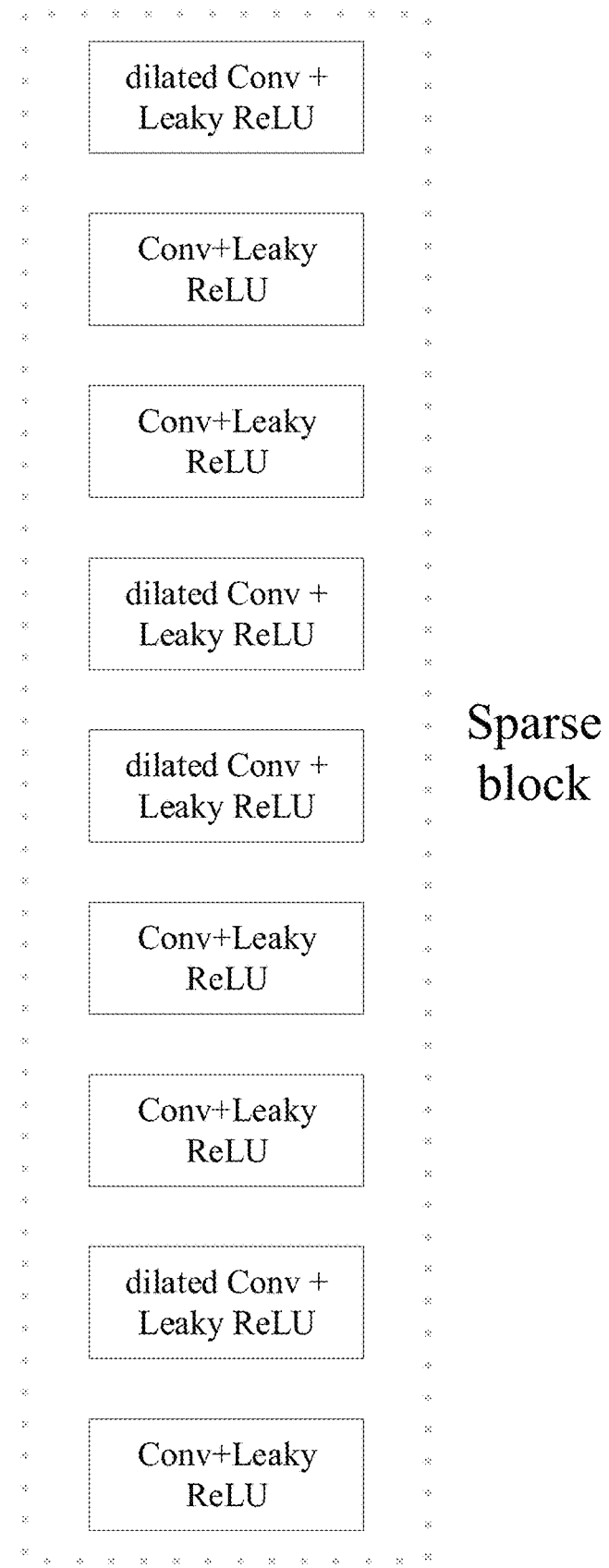
FIG. 4 is a structural schematic diagram of the sparse block.

The SB (see FIG. 4) consisting of 9 levels includes two types: dilated Conv+Leaky ReLU and Conv+Leaky ReLU. The dilated Conv+Leaky ReLU is arranged in the second, the fifth, the sixth, and the ninth layers of IADNet and considered as high-energy points. The Conv+Leaky ReLU is arranged in the first, the third, the fourth, the seventh, and the eighth layers of IADNet and considered as low-energy points. The size of the convolution kernels for the first to the ninth layers is 3×3, and the number of input channels for the first layer is C. If the given noise image is in color, C is 3; otherwise, C is 1. The Leaky ReLU activation function can give the input a small slope when the input is negative, ensuring the activation state of the neuron and expanding the perception range of the input.

The feature enhancement block (FEB) fully utilizes global and local features to mine more robust features through a long path, which complements the sparse block (SB) in processing noise images. The feature enhancement block (FEB) consists of five levels, including: Conv+Leaky ReLU, Conv and hyperbolic tangent activation function Tanh. The Conv+Leaky ReLU is applied in the tenth layer of IADNet, with an input size of 64×3×3×64. The Conv is applied in the eleventh layer of IADNet, with an input size of 64×3×3×c. Finally, the initial input of the network and the output of the eleventh layer are concatenated, followed by a compression operation, to enhance the representation ability of the denoising model. The final output size of the feature enhancement block (FEB) is 64×3×3×2c. In addition, the hyperbolic tangent activation function Tanh is used to transform the obtained features into nonlinearity, and the image denoising performance is improved through the feature enhancement block (FEB).

The attention block (AB) is used to guide the neural network to train the denoising model for reducing the training difficulty of the denoising model. The attention block (AB) includes 1 ×1 convolution operation and vector dot product operation. The input of the 1×1 convolution operation is connected to the output processed by the hyperbolic tangent activation function of the feature enhancement block (FEB), and the features obtained by the convolution operation are used as weight vectors to perform vector dot product operation with the output of the first convolution operation in the feature enhancement block (FEB); the output of the vector dot product operation is connected to the reconstruction block (RB) to obtain the output denoised image. The input size for the 1×1 convolution operation is 2c×1×1×c. The attention block (AB) implements the attention mechanism through the following two steps. The first step is to use a convolution of the size 1×1 of the fifteenth layer to compress the features into a vector, which serves as the previous stage before weight adjustment, thus improving denoising efficiency. The second step is to use the obtained weights to perform vector dot product operation with the output of the eleventh layer to extract more prominent noise features.

The reconstruction block (RB) can predict residual images and use reinforcement learning techniques to restore clearer images.

After being denoised by IADNet, the overall image quality of microscopic crack images is greatly improved, which can preserve more available feature information, including hidden feature information due to complex backgrounds. While ensuring the overall image quality, it also greatly improves the intuitive perception of the human eye, which is conducive to the training of segmentation neural networks in the next stage, accelerates network convergence, and reduces training difficulty.

The Training Process of IADNet:

The prepared dataset of microscopic crack images are divided into training sample set and testing sample set in a 9:1 ratio. And, each image in the training sample set is randomly rotated at different angles for 90°, 180° and 270° based on the original image. Training 200 epochs, a validation map is obtained. Training can be completed for cracks of any shape, iteratively training all images in sequence to complete denoising of microscopic crack images, improve the overall quality of microscopic crack images, and enhance the available feature information. When the training model reaches convergence, that is, when the training gradient of the model is close to 0, the optimal denoising parameters are extracted for prediction. Until the denoising evaluation effects of peak signal-to-noise ratio (PSNR) reaches 32.169 db and the structural similarity index measurement (SSIM) reaches 0.89, the entire improved attention-guided denoising neural network (IADNet) training is completed.

After the training of the improved attention-guided denoising neural network (IADNet) is completed, all prepared datasets of microscopic crack images are input into IADNet for batch denoising processing to improve the quality of microscopic crack images and construct a crack segmentation dataset, then through the MCR-Former network, the segmentation of microscopic cracks inside 3D printed concrete is achieved.

Figure 1:
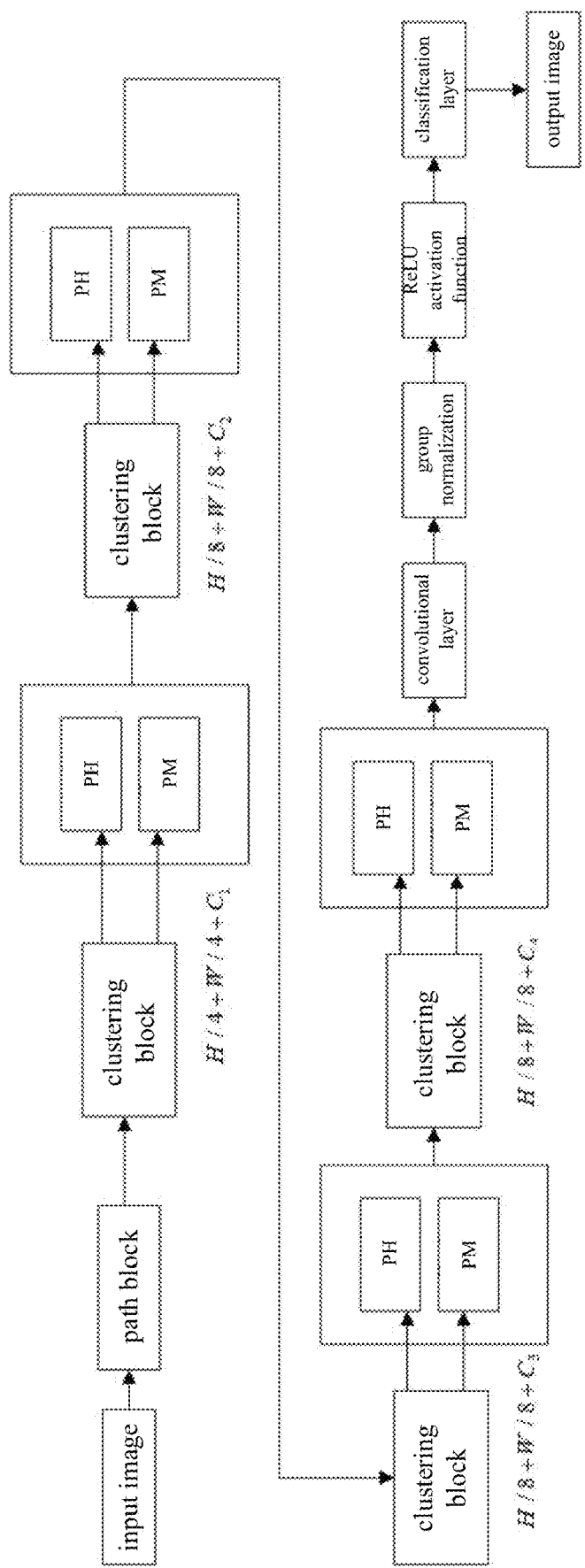
FIG. 1 is a structural schematic diagram of the MCR-Former network in the present disclosure.

3, MCR-Former (Microscopic Cracks Recognition-Former) Network for Quantitative Measurement of Microscopic Crack Images The overall architecture of the MCR-Former network is shown in FIG. 1, including a path block, four parallel structures connected in series, a convolutional layer, a group normalization, a ReLU activation function, and a classification layer. The parallel structures are filtered again through the convolutional layer to make the features recognized by the network more prominent. Then, the group normalization is used to simplify the network, the ReLU activation function is used to accelerate the training of the neural network, and finally, one convolutional layer is used as the classification layer (CLS) for single-scale feature to output the image.

The input image is processed through a path block (Stem block) to extract a feature F and complete path embedding. Then, the feature Fare clustered using a clustering module to obtain a prototype feature G, so as to construct a parallel structure including two heterogeneous operators: prototype-based high-frequency extractor (PH) and pixel enhancer module (PM). The prototype-based high-frequency extractor (PH) is a module based on converter and used for prototype-based high-frequency extractor to capture advantageous frequency components in G, an initial representation G' is obtained. The pixel enhancer module (PM) is a pixel enhancer based on CNN, through which the prototype representation G' is restored and the feature F" of the next stage are obtained. This process consists of four stages, each stage including a clustering block, a prototype-based high-frequency extractor (PH), and a pixel enhancer module (PM).

The MCR-Former network sets up convolutional layers and group normalization (GN) +ReLU activation functions before the classification layer (CLS), and has stable training dynamics that do not rely on statistical data between batches. It can better handle data diversity and improve performance on small data sets, simplifying model deployment and maintenance. At the same time, it has high computational efficiency and does not require exponential operations, which helps solve the problem of gradient vanishing, accelerates the training efficiency of the network, and is more conducive to extracting microscopic crack widths.

Figure 2:
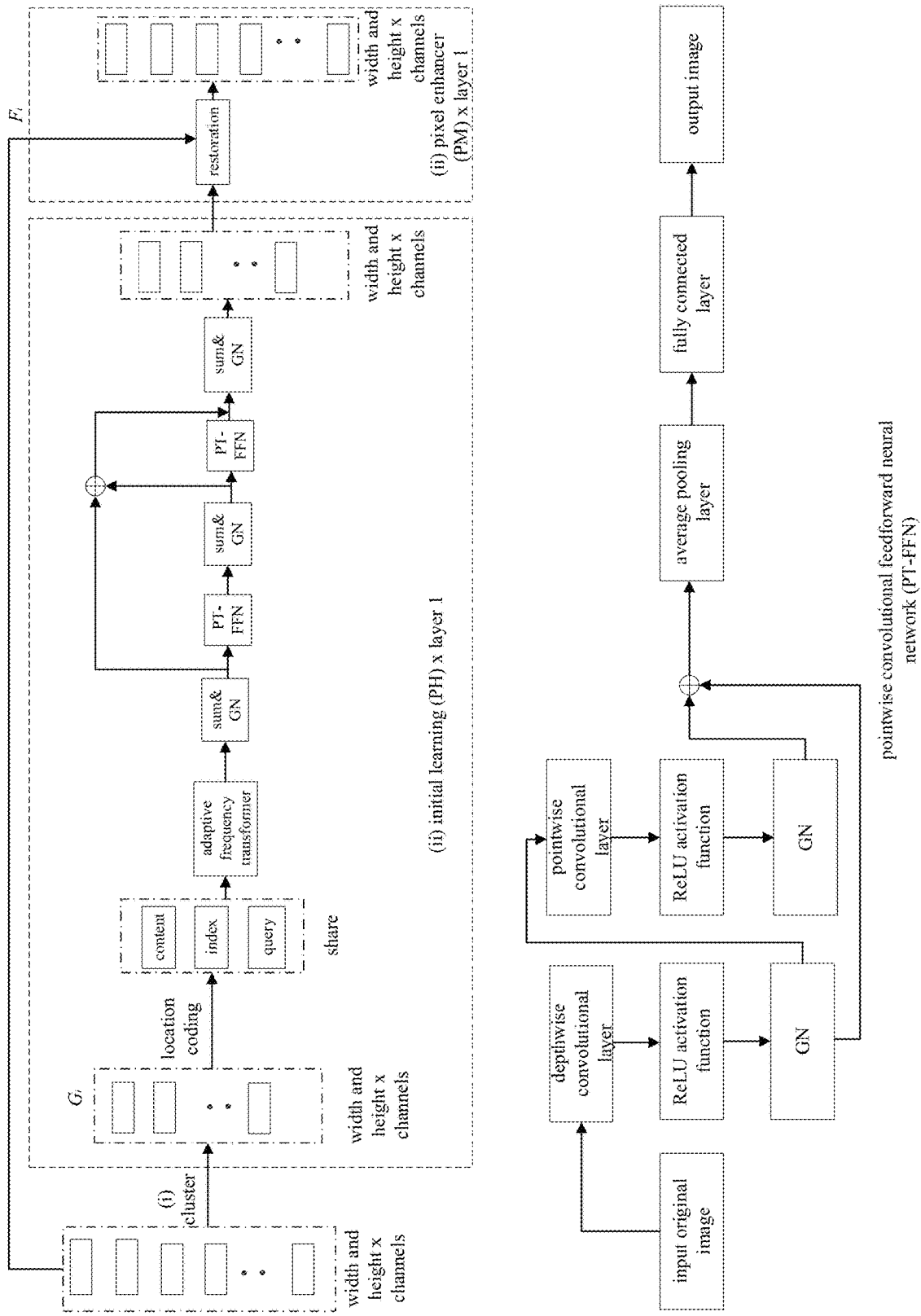
FIG. 2 is a structural schematic diagram of the prototype-based high-frequency extractor and pixel enhancement operator of the MCR-Former network in the present disclosure.

The parallel structure includes two heterogeneous operators, prototype-based high-frequency extractor (PH) and pixel enhancer module (PM), as shown in FIG. 2. The output data of the clustering block enters the prototype-based high-frequency extractor for processing. The prototype-based high-frequency extractor includes a position encoding, a shared layer, an adaptive frequency transformer, a summation group normalization, a PT-FFN module, a summation group normalization, a PT-FFN module, and a summation group normalization. The final group normalization result is the output of the prototype-based high-frequency extractor (PH), wherein the first two summation group normalization results are added and processed together with the output of the second pointwise convolution-feedforward neural network as the input of the third summation group normalization.

The pixel enhancer module (PM) receives the output of the prototype-based high-frequency extractor (PH) and the output of the clustering block for restoration operation to obtain the feature F' of the next stage.

The MCR-Former network innovatively introduces a pointwise convolutional feedforward neural network (PT-FFN) in a parallel structure (see FIG. 2), which includes an input layer, a depthwise convolutional layer, a ReLU activation function, a first group normalization (GN) layer, a pointwise convolutional layer, a ReLU activation function, a second group normalization (GN) layer, an average pooling layer, a fully connected layer, and an output layer which are connected in sequence. And the sum of the first group normalization (GN) layer and the second group normalization (GN) layer is used as the input for the average pooling layer. In PT-FFN, the convolutional layer is divided into two parts: depthwise convolution and pointwise convolution. The depthwise convolution uses independent convolution kernels to convolve the input channels separately, while the pointwise convolution uses a 1×1 convolution kernel to merge deep channels into fewer channels. After the convolutional layer, there is a non-linear activation function ReLU to enhance model expressiveness. After the activation function, a group normalization layer is used to accelerate training and improve the stability of the model, which can effectively reduce the number of model parameters, improve the computational efficiency of the model, and prevent overfitting.

The operation of PT-FFN module includes the following steps:

Pointwise Convolution: also known as 1×1 convolution, a 1×1 convolution kernel is used to process input feature maps for cross channel information fusion, while effectively adjusting the number of channels in the feature map to achieve dimension reduction or increase, effectively reducing the number of model parameters and computational complexity.

After depthwise separable convolution, a non-linear activation function ReLU is applied to introduce non-linear transformations and enhance feature expressiveness.

Feed-Forward Network: after the depthwise separable convolution and the non-linear activation function, the PT-FFN module applies a feedforward neural network consisting of fully connected layers located after the pooling layer. This feedforward neural network further performs feature transformation and context modeling, extracting richer semantic information.

The processing process of the crack segmentation dataset used for MCR Former network training is as follows:

(1.1) After denoising by the improved attention-guided denoising neural network (IADNet), performing data enhancement on all microscopic crack image datasets using the MSR algorithm:

① Performing log transformation on an original image to obtain a log image; ② Performing Gaussian blur on the log image to obtain a blurred log image with a low-frequency information part; ③ Performing difference between the original image and the blurred log image to obtain an image Q;

Performing ① ② ③ operations on R, G, and B three dimensions of the original image, respectively, and the difference is that the Gaussian blur in 2 respectively sets sigmoid parameters to 15, 80, and 200; finally, computing a weighted average of results of the ① ② ③ operations on the three dimensions, then merging the three dimensions, and scaling the data to 0-255 to obtain the crack segmentation dataset R*;

(1.2) Allocating the crack segmentation dataset R* in a 9:1 ratio to a training and validation dataset and a testing dataset for training the MCR-Former network.

Based on the microscopic crack segmentation result of the MCR-Former, combined with bilateral filtering, morphological processing, Canny edge detection, k+1-means clustering and eight-direction search method are used to achieve high-precision measurement of the microscopic crack width, and the overall steps are as follows:

1) Using bilateral filtering method, firstly Gaussian blur is applied to remove interfering pixels and preserve a true microscopic crack information.

2) Then, the microscopic cracks are refined through morphological processing to obtain a microscopic crack skeleton of single pixel; at this point, all pixel values in the microscopic crack skeletons are 0 or 1 to form a binary microscopic crack skeleton, called a single pixel microscopic crack skeleton;

Using the Canny edge detection algorithm, the grayscale gradient of the single pixel microscopic crack skeleton is calculated and the obtained grayscale gradient values are non maximum suppressed to enhance data accuracy, so as to obtain microscopic crack edge maps; the microscopic crack edge maps obtained by the Canny edge detection are logically processed pixel by pixel with the single pixel microscopic crack skeleton.

3) k+1-means clustering:

k+1-means means clustering method selects k+1 cluster center points based on the traditional k-means method, uses the k+1 th as a comparison parameter, and calculates the variance with the results of the previous k cluster centers to further enhance the data representation for optimization calculation and obtain the optimal solution.

k+1-means means algorithm performs clustering based on a certain point in space, classifies the objects closest to them, and iteratively updates the values of each cluster center until the best clustering result is obtained, in order to obtain the most ideal microscopic crack width.

k+1-means means algorithm takes parameters k+1 and divides the pre-input data objects into k+1 clusters to ensure that the obtained clusters meet the classification criteria. Objects in the same cluster have higher similarity, while objects in different clusters have lower similarity. Cluster similarity is calculated using a "central object" in the mean of objects in each cluster.

The implementation steps of the k+1-means algorithm are:

Selecting k+1 cluster center points for the results of logic and operations, using k+1 as comparison parameters, calculating the variance with the results of the previous k cluster center points, further enhancing the data representation for optimization calculation to obtain the optimal result, and the specific steps are:

Step 3-1: randomly initializing k+1 points in an input image set, and selecting k points from the k+1 points as initial target center points for the k+1-means algorithm;

Step 3-2: using the Euclidean distance calculation formula to calculate the geometric distances between the input image set and the initialization target center point;

Step 3-3: allocating each point of data to the nearest cluster according to the principle of shortest distance;

Step 3-4: calculating the geometric center of each cluster for the new round using the following formula, $$P_y = \frac{\sum_{i=1}^{p} P_{iy}}{p}$$

$$P_x = \frac{\sum_{i=1}^{p} P_{ix}}{p}$$

Wherein $P_x$ and $P_y$ represent the horizontal coordinate and the vertical coordinate of the geometric center point to be calculated for the current cluster respectively; $P_{ix}$ and $P_{iy}$ represent the horizontal coordinate and the vertical coordinate of the ith point in the current cluster respectively; P represent the number of points in the current cluster;

Using the geometric centers of the sample data in each cluster as the clustering centers for the new classification;

Step 3-5: performing iterative repetitions of step 3-2, step 3-3, and step 3-4 until the algorithm converges, i.e., the center point no longer changes, and output clustering results;

Step 3-6: optimizing the clustering results obtained by taking the variance between the obtained k center points and the k+1 th center point, using the following formula:

$$S^2 = \frac{\sum_{j=1}^{k}(x_{k+1} - x_j)^2}{k+1}$$

Wherein $x_{k+1}$ represents the coordinates of the k+1 th center point, $x_j$ (j=1, 2, ... k) represents the coordinates of the k th cluster center point; selecting the cluster center point with the smallest variance to determine the optimal cluster center point;

Determining the optimal clustering result.

4) Skeleton extraction: extracting the skeleton from the results of k+1-means clustering, and the specific skeleton extraction process is as follows:

Iterating through all foreground pixels and mark pixels that meet any of the following conditions as deletion:

$2 \leq N(F_1) \leq 6$      1)

$S(F_1) = 1$      2)

$F_2 F_4 F_6 = 0$      3)

$F_4 F_6 F_8 = 0$      4)

$F_2 F_4 F_8 = 0$      5)

$F_2 F_6 F_8 = 0$      6)

Wherein, $N(F_1)$ represents the number of foreground pixels among the 8 pixels adjacent to, $F_1$, $S(F_1)$ represents the cumulative number of occurrences from 0-1 from the pixels $F_2$-$F_9$-$F_2$, where 0 represents the background, and 1 represents the foreground. The complete pixel position distribution of $F_1$-$F_9$ is shown as below, wherein $F_1$ is the center point, the adjacent pixel directly above $F_1$ is $F_2$, and then the next adjacent pixel surrounding $F_1$ is marked counterclockwise from $F_2$ as $F_3$-$F_9$.

| $F_9$ | $F_2$ | $F_3$ |
|---|---|---|
| $F_8$ | $F_1$ | $F_4$ |
| $F_7$ | $F_6$ | $F_5$ |

Until no pixels are marked as deletion, the output result is the refined skeleton of the binary image. Skeleton extraction makes micro cracks clearer, removes image interference, and further improves the accuracy of width calculation.

5) Using the eight-direction search method to calculate the microscopic crack width:

For the refined skeleton of the binary image, each microscopic crack point is used as the initial target center point for width measurement, performing the eight-direction search started from the initial target center point in the extracted refined skeleton of the binary image; if it is a microscopic crack point, the number of pixels in that direction is increased by 1 until the microscopic crack boundary is reached, counting the number of microscopic crack pixels in the eight directions of 0°, 45°, 90°, 135°, 180°, 225°, 270°, 315° where one center point is located, and recording as $n_1$, $n_2$, $n_3$, $n_4$, $n_5$, $n_6$, $n_7$, and $n_8$; merging the number of microscopic crack points in four directions: 0° and 180°, 45° and 225°, 90° and 270°, 135° and 315°, and the merging method is: $d_1 = n_1 + n_5$, $d_2 = 2^{1/2}(n_2 + n_6)$, $d_3 = n_3 + n_7$, $d_4 = 2^{1/2}(n_4 + n_8)$, taking, D=min $\{d_1, d_2, d_3, d_4\}$, and recording the direction of D obtained, wherein $d_1$, $d_2$, $d_3$, $d_4$ are the number of pixels in the merged four straight line directions; calculating $w = w_0 \times D$, wherein $w_0$ is the actual physical size represented by each pixel, and W is the actual width of the microscopic crack at the target center point; updating to the next center point until the width at all center points is measured.

Before measuring microscopic cracks in eight directions, the k+1-means clustering algorithm is first used to cluster the microscopic crack pixels, and the skeleton extraction is performed on the results of multiple clusters to obtain the final output result. Then, the eight-direction search method is used to calculate the microscopic crack width. This makes it easy to extract the center point of microscopic crack pixels and the endpoint of microscopic crack width for any irregularly shaped microscopic crack curve. Most microscopic crack shapes seen in daily life are irregular, and this method effectively solves the problem of inaccurate measurement of microscopic crack width using traditional eight direction search method.

The microscopic crack defect image of the 3D printed concrete in printing areas to be detected is denoised by IADNet in advance, and then input to MCR-Former network, and the measurement parameter threshold is set. If the MCR-Former network recognizes the microscopic crack defect image and the microscopic crack width is greater than the measurement parameter threshold, the printing is stopped to check the material state. If it does not exceed the threshold range of measurement parameters, the printed material is qualified.

Embodiment 1

In the present embodiment, a quantification system for microscopic cracks inside 3D printed concrete is provided, which includes:

An image acquisition module, configured to obtain the microscopic crack images of the 3D printed concrete in the printing areas;

An image processing module, configured to segment and label the microscopic crack images of the image acquisition module at a pixel level, add IADNet to preprocess the microscopic crack images for denoising, and then perform data augmentation representation to obtain the crack segmentation dataset;

A 3D printed concrete microscopic crack segmentation model, using MCR-Former neural network for microscopic crack image segmentation;

A width processing and calculation module, utilizing bilateral filtering, morphological processing, Canny edge detection, k+1-means clustering and eight-direction search method to achieve high-precision measurement of the microscopic crack width and obtain the actual width of microscopic cracks;

A microscopic crack threshold feedback processing module, configured to compare the actual width of microscopic cracks obtained by the width processing and calculation module with the measurement parameter threshold; if the actual width of microscopic cracks exceeds the measurement parameter threshold, it is considered that the quality of the 3D printed product is unqualified, feedback is given to stop printing and check the material status, and the backend system automatically reduces the movement speed of the printer nozzle, increases the discharge speed, and prompts relevant personnel to check the material status; if the actual width of microscopic cracks does not exceed the measurement parameter threshold, the 3D printed product is considered qualified.

When using the microscopic crack image dataset to train IADNet in this embodiment, the iteration number is set to 40000, and when the training gradient approaches 0, the model reaches convergence. Setting the threshold value of measurement parameters as 5.0 μm checking the width of microscopic crack, if the width of microscopic crack is not greater than 5.0 μm, considering the material printing as qualified, if the width of microscopic cracks is greater than 5 μm, the printing is unqualified. When it is unqualified, the backend system will automatically slow down the printing speed and increase the pumping speed, and arrange staff to check the material status. If the image is not recognized as a defect, the microscopic crack width is also recognized as qualified.

The hardware used in the present disclosure further includes:

Processor: as the core component of the present disclosure, a processor is responsible for controlling and managing the operation of the entire system, including data acquisition, data processing, image recognition, and other functions, and requires sufficient computing and parallel processing capabilities to meet real-time requirements; and the processor can adopt different forms such as single chip microcomputer, microprocessor, computer, etc. to meet the needs of different application scenarios;

Memory: a memory can be used to store collected data and historical data for subsequent processing and analysis, which has the characteristics of high speed, high reliability, and scalability to meet the requirements of long-term stable operation of the system;

Database: a backend system needs to use a database to store and manage collected data, historical data, and analysis results;

Network interface: the backend system needs to use network interfaces to exchange and communicate data with the frontend system and other external systems, which have the characteristics of high speed, high stability, and high security, ensuring the reliability and security of data transmission.

The present disclosure is mainly applied to achieve quantitative analysis of microscopic crack in 3D printed concrete, which can automatically screen qualified materials until all areas meet the requirements after printing, and complete behavioral analysis.

MCR-Former can effectively learn spatial relationships and semantic information between features, improving the accuracy of semantic segmentation. The PT-FFN module has a lightweight structure that can reduce the computational complexity of the model, making it suitable for real-time semantic segmentation tasks in resource constrained environment. Firstly, the MCR-Former network is applied to separate microscopic cracks from the background, and then processing methods including edge detection algorithms are applied to extract the actual width of microscopic cracks based on the segmentation results, in order to obtain more accurate and complete microscopic crack edges.

Compared with existing methods, the present disclosure uses an improved attention-guided denoising neural network for data preprocessing on multiple semantic segmentation datasets. Compared with SegFormer, MCR Former does not have a decoder module and has lower computational complexity and better performance. In addition, the present disclosure was compared with other models trained for microcrack recognition, and the comparison results are as follows:

| Model | Average pixel accuracy (%) | Pixel accuracy (%) | Q idth measurement accuracy (%) |
| --- | --- | --- | --- |
| MCR-Former | 89.76 | 94.85 | 92.76 |
| A FFormer | 87.61 | 93.22 | 90.25 |
| Swin-Transformer | 83.32 | 92.34 | 89.72 |
| U -Net | 78.23 | 89.23 | 84.25 |
| FCN | 73.78 | 87.55 | 83.64 |

In the image processing of microscopic cracks, the pixel accuracy and average pixel accuracy of MCR-Former are 0.23% and 2.15% higher than those of the existing AFFormer, respectively, and the width measurement accuracy of microscopic crack is increased by 1.51%. Compared with other Transformer models, the difference is more significant, which proves that the method used in the present disclosure is innovative and has superior application performance.

The present disclosure provides a system and method for measuring and analyzing microscopic cracks in 3D printed concrete based on MCR-Former, aiming to solve the problem of inaccurate monitoring of micro quality in 3D printed concrete. The present disclosure can quantitatively analyze microscopic cracks and automatically screen out unqualified materials when the width of microscopic cracks exceeds a set threshold. Compared with existing technologies, this technical solution has the following advantages and application prospects: reducing labor costs, improving printing efficiency, ensuring the deep quality of printed products, and providing the possibility for pursuing 3D printing at a larger scale in the construction industry. This is of great significance for the 3D printing industry and has broad application prospects.

It should be understood that the various parts of the present disclosure can be implemented using hardware, software, firmware, or a combination thereof. In the above embodiments, multiple steps or methods can be implemented using software or firmware stored in memory and executed by a suitable instruction execution system.

Those skilled in the art can understand that all or part of the steps carried by the method of the above embodiments can be completed by instructing related hardware through a program, which can be stored in a computer-readable storage medium, and the program, when executed, includes one or a combination of the steps of the method embodiment.

The aspects not mentioned in the present disclosure are applicable to the prior art.

What is claimed is:

1. A quantification method for microscopic cracks inside 3D printed concrete, comprising the following steps:

1) Preparing a microscopic crack image dataset
using backscattered electron (BSE) to obtain defect image data of printing areas of 3D printed concrete, forming the microscopic crack image dataset, wherein the microscopic crack image dataset comprises 3D printed concrete microscopic crack images, non 3D printed concrete microscopic crack images, and concrete images without microscopic cracks;

2) Treating of improved attention-guided denoising neural network (IADNet)
constructing an improved attention-guided denoising neural network (IADNet), wherein the improved attention-guided denoising neural network (IADNet) comprises a sparse block (SB), a feature enhancement block (FEB), an attention block (AB), and a reconstruction block (RB);
the sparse block (SB) comprises five convolutional layers and four dilated convolutional layers, each layer comprising a Leaky ReLU function stacked with convolution or dilated convolution, connected in a order of one convolutional layer, one dilated convolutional layer, two convolutional layers, two dilated convolutional layers, two convolutional layers, and one dilated convolutional layer;
the feature enhancement block (FEB) comprises a convolutional layer, a convolution operation, a compression concatenation operation, a convolution operation, and a hyperbolic tangent activation function connected in sequence; an output result of the sparse block (SB) is used as an input of the feature enhancement block (FEB);
the attention block (AB) comprises 1×1 convolution operation and vector dot product operation; an input of the 1×1 convolution operation is connected to an output processed by the hyperbolic tangent activation function of the feature enhancement block (FEB), and features obtained by the 1×1 convolution operation are used as weight vectors to perform vector dot product operation with an output of a first convolution operation in the feature enhancement block (FEB); an output of the vector dot product operation is connected to the reconstruction block (RB) to obtain an output denoised image;
training the improved attention-guided denoising neural network (IADNet) using the microscopic crack image dataset to obtain a trained improved attention-guided denoising neural network (IADNet), then applying the trained improved attention-guided denoising neural network (IADNet) to denoise the images to construct a crack segmentation dataset;

3) Constructing MCR-Former network for quantitative measurement of microscopic crack images
training the MCR-Former network using the crack segmentation dataset to obtain a trained MCR-Former neural network;
performing denoising treatment using the trained improved attention-guided denoising neural network (IADNet), then inputting vector data into the trained MCR-Former neural network to obtain a microscopic crack segmentation result, and then further calculating a microscopic crack width based on the microscopic crack segmentation result.

2. The quantification method according to claim 1, wherein
a process of constructing the crack segmentation dataset is as follows: after denoising by the improved attention-guided denoising neural network (IADNet), performing data enhancement on all microscopic crack image datasets using the MSR algorithm:
① performing log transformation on an original image to obtain a log image; ② performing Gaussian blur on the log image to obtain an blurred log image with a low-frequency information part; ③ performing difference between the original image and the blurred log image to obtain an image Q;
performing ① ② ③ operations on R, G, and B three dimensions of the original image, respectively, and the difference is that the Gaussian blur in ② respectively sets sigmoid parameters to 15, 80, and 200; finally, computing a weighted average of results of the ① ② ③ operations on the three dimensions, then merging the three dimensions, and scaling the data to 0-255 to obtain the crack segmentation dataset R*;
allocating the crack segmentation dataset R* in a 9:1 ratio to a training and validation dataset and a testing dataset for training the MCR-Former network.

3. The quantization method according to claim 1, wherein the MCR-Former outputs the category to which each pixel of the input image belongs, achieving semantic segmentation;
based on the microscopic crack segmentation result of the MCR-Former, combined with bilateral filtering, morphological processing, Canny edge detection, k+1-means clustering and eight-direction search method are used to achieve high-precision measurement of the microscopic crack width, and the overall steps are as follows:

1) Using bilateral filtering method, firstly Gaussian blur is applied to remove interfering pixels and preserve a true microscopic crack information;

2) Then, the microscopic cracks are refined through morphological processing to obtain a microscopic crack skeleton of single pixel; at this point, all pixel values in the microscopic crack skeletons are 0 or 1 to form a binary microscopic crack skeleton, called a single pixel microscopic crack skeleton; using the Canny edge detection algorithm, the grayscale gradient of the single pixel microscopic crack skeleton is calculated to find image edges and obtain microscopic crack edge maps; the microscopic crack edge maps obtained by the Canny edge detection are logically processed pixel by pixel with the single pixel microscopic crack skeleton;

3) k+1-means clustering:
selecting k+1 cluster center points for the results of logic and operations, using k+1 as comparison parameters, calculating the variance with the results of the previous k cluster center points, further enhancing the data representation for optimization calculation to obtain the optimal result, and the specific steps are:
step 3-1: randomly initializing k+1 points in an input image set, and selecting k points from the k+1 points as initial target center points for the k+1-means algorithm;
step 3-2: using the Euclidean distance calculation formula to calculate the geometric distances between the input image set and the initialization target center point;
step 3-3: allocating each point of data to the nearest cluster according to the principle of shortest distance;
step 3-4: calculating the geometric center of each cluster for the new round using the following formula, $$P_y = \frac{\sum_{i=1}^{p} P_{iy}}{p}$$

$$P_x = \frac{\sum_{i=1}^{p} P_{ix}}{p}$$

wherein $P_x$ and $P_y$ represent the horizontal coordinate and the vertical coordinate of the geometric center point to be calculated for the current cluster respectively; $P_{ix}$ and $P_{iy}$ represent the horizontal coordinate and the vertical coordinate of the i th point in the current cluster respectively; p represent the number of points in the current cluster;

using the geometric centers of the sample data in each cluster as the clustering centers for the new classification;

step 3-5: performing iterative repetitions of step 3-2, step 3-3, and step 3-4 until the algorithm converges, the center point no longer changes, and output clustering results;

step 3-6: optimizing the clustering results obtained by taking the variance between the obtained k center points and the k+1th center point, using the following formula:

$$S^2 = \frac{\sum_{j=1}^{k}(x_{k+1} - x_j)^2}{k+1}$$

wherein $x_{k+1}$ represents the coordinates of the k+1 th center point, $x_j$ (j=1, 2, ... k) represents the coordinates of the k th cluster center point; selecting the cluster center point with the smallest variance to determine the optimal cluster center point;

determining the optimal clustering result;

4) skeleton extraction: extracting the skeleton from the results of k+1-means clustering, and the specific skeleton extraction process is as follows:

iterating through all foreground pixels and mark pixels that meet any of the following conditions as deletion:

$2 \leq N(F_1) \leq 6$ $S(F_1) = 1$ $F_2 F_4 F_6 = 0$ $F_4 F_6 F_8 = 0$ $F_2 F_4 F_8 = 0$ $F_2 F_6 F_8 = 0$ wherein, $N(F_1)$ represents the number of foreground pixels among the 8 pixels adjacent to $F_1$, $S(F_1)$ represents the cumulative number of occurrences from 0-1 from the pixels $F_2$-$F_9$-$F_2$, where 0 represents the background, 1 represents the foreground, and F represents a pixel point; and the complete pixel position distribution of is: $F_1$-$F_9$

| $F_9$ | $F_2$ | $F_3$ |
| --- | --- | --- |
| $F_8$ | $F_1$ | $F_4$ |
| $F_7$ | $F_6$ | $F_5$ | until no pixels are marked as deletion, the output result is the refined skeleton of the binary image;

5) Using the eight-direction search method to calculate the microscopic crack width:

for the refined skeleton of the binary image, each microscopic crack point is used as the initial target center point for width measurement, performing the eight-direction search started from the initial target center point in the extracted refined skeleton of the binary image; if it is a microscopic crack point, the number of pixels in that direction is increased by 1 until the microscopic crack boundary is reached, counting the number of microscopic crack pixels in the eight directions of 0°, 45°, 90°, 135°, 180°, 225°, 270°, 315° where one center point is located as n1, n2, n3, n4, n5, n6, n7, and n8; merging the number of microscopic crack points in four directions: 0° and 180°, 45° and 225°, 90° and 270°, 135° and 315°, and the merging method is: $d_1 = n_1 + n_5$, $d_2 = 2^{1/2}(n_2 + n_6)$, $d_3 = n_3 + n_7$, $d_4 = 2^{1/2}(n_4 + n_8)$, taking D=min $\{d_1, d_2, d_3, d_4\}$, and recording the direction of D obtained, wherein $d_1$, $d_2$, $d_3$, $d_4$ are the number of pixels in the merged four straight line directions; calculating $W = w_0 \times D$ wherein $w_0$ is the actual physical size represented by each pixel, and w is the actual width of the microscopic crack at the target center point; updating to the next center point until the width at all center points is measured.

4. The quantification method according to claim 1, wherein a measurement parameter threshold is set, and if the MCR-Former network recognizes a microscopic crack defect image and the microscopic crack width is greater than the measurement parameter threshold, then stop the printing and check the material status; if the microscopic crack width is not exceed the measurement parameter threshold, then the printed material is qualified.

5. The quantization method according to claim 1, wherein when the training of the improved attention-guided denoising neural network (IADNet) is completed, a peak signal-to-noise ratio (PSNR) of denoising evaluation effect is not less than 32.169 db, and a structural similarity value (SSIM) is not less than 0.89.

6. The quantization method according to claim 1, wherein a pointwise convolutional-feedforward neural network (PT-FFN) is introduced into the parallel structure of the MCR-Former network, comprising sequentially connected an input layer, a depthwise convolutional layer, a ReLU activation function, a first group normalization layer, a pointwise convolutional layer, a ReLU activation function, a second group normalization layer, an pooling layer, a fully connected layer, and an output layer; and a sum of the normalization layers of the first group normalization layer and the second group normalization layer is used as an input of the average pooling layer;

a size of a convolution kernel of the pointwise convolutional layer is 1×1.

7. The quantization method according to claim 1, wherein the sparse block (SB) in the improved attention-guided denoising neural network (IADNet) has nine layers, and a first layer, a third layer, a fourth layer, a seventh layer, and an eighth layer are considered as low-energy points and set with convolutional layers (Conv+Leaky ReLU); a second layer, a fifth layer, a sixth layer, and a ninth layer are considered high-energy points and are set as dilated convolutional layers (dilated Conv+Leaky ReLU); a size of the convolutional filter for the first layer to the ninth layer is 3×3, an input for the first layer is the number of channels c in an input noise image, and if the input noise image is in color, c is 3, otherwise, c is 1;

the feature enhancement block (FEB) has five levels, including three types: Conv+Leaky ReLU, Conv, and hyperbolic tangent activation function Tanh; the convolutional layer of Conv+Leaky ReLU applied in a tenth layer of the improved attention-guided denoising neural network (LADNet) has an output size of 64×3×3×64; an eleventh layer of the improved attention-guided denoising neural network (LADNet) through adjustment of Conv convolution has an output size 64×3×3×c; finally, an initial input of network and the output of the eleventh layer are concatenated through Concat compression concatenation operation, then processed through Conv convolution operation, and a final output size is 64×3×3×2c; the obtained features are converted into nonlinear features using the hyperbolic tangent activation function Tanh;

an input size for the 1×1 convolution operation of the attention block (AB) is 2c×1×1×c.

8. A quantification system for microscopic cracks inside 3D printed concrete, executing the quantification method according to claim 1, comprising:

an image acquisition module, configured to obtain the microscopic crack images of the 3D printed concrete in the printing areas;

an image processing module, configured to segment and label the microscopic crack images of the image acquisition module at a pixel level, add IADNet to preprocess the microscopic crack images for denoising, and then perform data augmentation representation to obtain the crack segmentation dataset;

a 3D printed concrete microscopic crack segmentation model, using MCR-Former neural network for microscopic crack image segmentation;

a width processing and calculation module, utilizing bilateral filtering, morphological processing, Canny edge detection, k+1-means clustering and eight-direction search method to achieve high-precision measurement of the microscopic crack width and obtain an actual width of microscopic cracks;

a microscopic crack threshold feedback processing module, configured to compare the actual width of microscopic cracks obtained by the width processing and calculation module with the measurement parameter threshold; if the actual width of microscopic cracks exceeds the measurement parameter threshold, it is considered that the quality of the 3D printed product is unqualified, and feedback is given to stop printing and check the material status; if the actual width of microscopic cracks does not exceed the measurement parameter threshold, the 3D printed product is considered qualified.

9. A non-transitory computer-readable storage medium storing a computer program, characterized in that the computer program implements the steps of the methods described in claim 1 when executed by a processor.

* * * * *